United States Patent
Natarajan et al.

(10) Patent No.: US 11,673,323 B2
(45) Date of Patent: Jun. 13, 2023

(54) FLUORESCENT BINDERS FOR USE IN MONITORING ADDITIVE MANUFACTURING PROCESSES

(71) Applicant: General Electric Company, Schenectady, NY (US)

(72) Inventors: Arunkumar Natarajan, Mason, OH (US); Joshua Tyler Mook, Cincinnati, OH (US); Kwok Pong Chan, Niskayuna, NY (US); William C. Alberts, Saratoga Springs, NY (US); Vadim Bromberg, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 43 days.

(21) Appl. No.: 17/326,707

(22) Filed: May 21, 2021

(65) Prior Publication Data

US 2021/0370588 A1  Dec. 2, 2021

Related U.S. Application Data

(60) Provisional application No. 63/029,961, filed on May 26, 2020.

(51) Int. Cl.
- *B29C 64/165* (2017.01)
- *B33Y 10/00* (2015.01)

(Continued)

(52) U.S. Cl.
CPC ............ *B29C 64/165* (2017.08); *B33Y 10/00* (2014.12); *B33Y 70/10* (2020.01); *B33Y 80/00* (2014.12); *C08K 5/0041* (2013.01); *C09B 57/00* (2013.01)

(58) Field of Classification Search
CPC ....... B29C 64/165; B33Y 10/00; B33Y 70/10; B33Y 80/00; B33Y 70/00; C08K 5/0041;
(Continued)

(56) References Cited

U.S. PATENT DOCUMENTS

| 7,348,075 B2 | 3/2008 | Farr et al. |
| 7,422,713 B2 | 9/2008 | Oriakhi et al. |

(Continued)

FOREIGN PATENT DOCUMENTS

| WO | 2019036126 A1 | 2/2019 |
| WO | 2019245845 A1 | 12/2019 |

OTHER PUBLICATIONS

Extended European Search Report for EP Application No. 21174265.5 dated Oct. 25, 2021.

(Continued)

*Primary Examiner* — Nahida Sultana
(74) *Attorney, Agent, or Firm* — Dinsmore & Shohl LLP (57) ABSTRACT

A method of manufacturing a green body part comprises depositing a layer of a powder on a working surface; and selectively depositing a binder solution comprising a thermoplastic binder, a fluorescent material, and a binder medium into the layer of powder in a pattern representative of a structure of a layer of the green body part. The thermoplastic binder comprises one or more polymer strands dissolved in a solvent medium having an average molecular weight from greater than or equal to 7,000 g/mol to less than or equal to 100,000 g/mol. Binder solutions comprising fluorescent material and green body parts adhered together using the same are also disclosed.

20 Claims, 3 Drawing Sheets (51) Int. Cl.
  *B33Y 80/00* (2015.01)
  *B33Y 70/10* (2020.01)
  *C08K 5/00* (2006.01)
  *C09B 57/00* (2006.01)

(58) Field of Classification Search
  CPC ........ C08K 5/3477; C08K 9/10; C09B 57/00; Y02P 10/25; B22F 1/107; B22F 10/38; B22F 12/41; B22F 12/90; B22F 2999/00; B22F 10/14; C08L 29/04; G01N 21/6428; G01N 2021/6439

See application file for complete search history.

(56) References Cited

U.S. PATENT DOCUMENTS

| | | | |
|---|---|---|---|
| 7,455,805 B2 | 11/2008 | Oriakhi et al. | |
| 9,481,779 B2 | 11/2016 | Kim | |
| 9,815,118 B1 | 11/2017 | Schmitt et al. | |
| 9,833,839 B2 | 12/2017 | Gibson et al. | |
| 9,976,958 B2 | 5/2018 | Hjelmgaard et al. | |
| 10,272,492 B2 | 4/2019 | Gibson et al. | |
| 2004/0173946 A1 | 9/2004 | Pfeifer et al. | |
| 2005/0174409 A1* | 8/2005 | Taguchi | C09D 11/328 347/100 |
| 2008/0193373 A1* | 8/2008 | Stritzker | A61K 35/74 435/235.1 |
| 2009/0298114 A1* | 12/2009 | Courtney | G01N 21/6458 435/173.9 |
| 2020/0148946 A1 | 5/2020 | Smartt et al. | |
| 2021/0163724 A1* | 6/2021 | Itzhak-Sigron | B44C 1/227 |

OTHER PUBLICATIONS

Japanese Office Action for Japanese Patent Application No. 2021-086398 dated Sep. 27, 2022 (7 pages).

* cited by examiner

FLUORESCENT BINDERS FOR USE IN MONITORING ADDITIVE MANUFACTURING PROCESSES

CROSS-REFERENCE TO RELATED APPLICATIONS

The present specification claims the benefit of U.S. Provisional Application Ser. No. 63/029,961 filed May 26, 2020 and entitled "Fluorescent Binders For Use in Monitoring Additive Manufacturing Processes," the entirety of which is incorporated by reference herein.

FIELD

This disclosure relates to additive manufacturing and, more particularly, to binders for use in additive manufacturing processes.

BACKGROUND

Additive manufacturing, also known as 3D printing, is a process in which material is built up layer by layer to form an object. Binder jetting is an additive manufacturing technique based on the use of a binder to join particles of a powder to form a three-dimensional object. In particular, the binder is jetted from a print head onto successive layers of the powder in a build volume, where layers of the powder and the binder adhere to one another to form a three-dimensional object. In some applications, the printed part is suitable for end-use. In other applications, subsequent processing, such as removal of the binder and sintering of the powder, may be needed to transform the printed three-dimensional object into a finished part.

The presence of too much or too little binder in the printed part can affect the quality of the final part. For example, if too little binder is applied to the powder layer, such as may result from a clogged jet of the print head, the powder may not be sufficiently bound and part of the layer may be removed when the part is depowdered. As another example, if too much binder is applied, or if the binder is not cured at the expected rate, the part may be moved or depowdered before the part has sufficient strength, which may result in breakage or distortion of the part. Additionally, the application of too much binder can cause bleed and result in incorrect print geometry. However, conventional binders do not present sufficient visual contrast to enable reliable optical observation of quantity, geometric fidelity, and extent of cure of binder deposited into the powder bed.

Accordingly, the need exists for alternative binder solutions that enable monitoring of additive manufacturing processes.

SUMMARY

Various embodiments disclosed herein meet these needs by providing a binder solution comprising a linkable thermoplastic binder, a fluorescent material, and a binder medium. In various embodiments, the fluorescent material is encapsulated, either prior to addition into the binder solution or by one or more other components in the binder solution, to protect the fluorescent material from quenching by the material in the powder bed. Accordingly, the binder solution fluoresces in response to exposure to electromagnetic radiation, thereby enabling the amount of binder solution present to be monitored using an optical system. Additional features and advantages will be described in greater detail below.

According to a first aspect disclosed herein, a method of manufacturing a green body part comprises depositing a layer of a powder on a working surface; and selectively depositing a binder solution comprising a thermoplastic binder, a fluorescent material, and a binder medium into the layer of powder in a pattern representative of a structure of a layer of the green body part. The thermoplastic binder comprises one or more polymer strands dissolved in a solvent medium having an average molecular weight from greater than or equal to 7,000 g/mol to less than or equal to 100,000 g/mol.

According to a second aspect disclosed herein, a method of manufacturing a green body part comprises the method according to the first aspect, wherein the fluorescent material is encapsulated prior to incorporation into the binder solution.

According to a third aspect disclosed herein, a method of manufacturing a green body part comprises the method according to the first or second aspects, wherein the fluorescent material is encapsulated on mixing into the binder solution.

According to a fourth aspect disclosed herein, a method of manufacturing a green body part comprises the method according to any of the previous aspects, wherein the first polymer strand comprises one or more polymer species selected from the group consisting of polyvinyl alcohol (PVA), polyamides, polyacryl amide (PAAm), polyvinyl pyrrolidone (PVP), polyacrylic acid (PAA), polymethacrylic acid (PmAA), polymethyl methacrylate (PMMA), polyvinyl methyl ether-maleic anhydride (PVME-MA), polystyrene (PS), polyethylene oxide, polyethylene glycol (PEG), derivatives thereof, and combinations thereof.

According to a fifth aspect disclosed herein, a method of manufacturing a green body part comprises the method according to any of the previous aspects, wherein the one or more polymer strands of the thermoplastic binder comprise a first polymer strand and a second polymer strand, wherein the first polymer strand comprises a first functional group and the second polymer strand comprises a second functional group different from the first functional group, wherein the first and second functional groups are configured to non-covalently couple the first polymer strand with the second polymer strand, and wherein the second polymer strand has an average molecular weight greater than or equal to 100 g/mol and less than or equal to 10,000 g/mol.

According to a sixth aspect disclosed herein, a method of manufacturing a green body part comprises the method according to any of the previous aspects, wherein the fluorescent material comprises an aromatic dye that is encapsulated.

According to a seventh aspect disclosed herein, a method of manufacturing a green body part comprises the method according to the sixth aspect, wherein the aromatic dye is selected from the group consisting of a stilbene dye, pyrene dye, a coumarin dye, an anthracene dye, a tetracene dye, and combinations thereof.

According to an eighth aspect disclosed herein, a method of manufacturing a green body part comprises the method according to any of the previous aspects, wherein the fluorescent material comprises a chromophore having at least one sulfonate or triazine group.

According to a ninth aspect disclosed herein, a method of manufacturing a green body part comprises the method according to the eighth aspect, wherein the chromophore comprises two, three, or four sulfonate groups.

According to a tenth aspect disclosed herein, a method of manufacturing a green body part comprises the method according to the eighth aspect, wherein the chromophore is a stilbene-based chromophore.

According to an eleventh aspect disclosed herein, a method of manufacturing a green body part comprises the method according to any of the previous aspects, wherein the binder solution is an aqueous binder solution.

According to a twelfth aspect disclosed herein, a method of manufacturing a green body part comprises the method according to any of the previous aspects, wherein the encapsulated fluorescent material is present in an amount of from 0.01 wt % to 5 wt % based on a total weight of the binder solution.

According to a thirteenth aspect disclosed herein, a method of manufacturing a green body part comprises the method according to any of the previous aspects, wherein the encapsulated fluorescent material is present in an amount of from 0.1 wt % to 1 wt % based on a total weight of the binder solution.

According to a fourteenth aspect disclosed herein, a method of manufacturing a green body part comprises the method according to any of the previous aspects, the method further comprising: exposing the layer of the green body part to electromagnetic radiation; curing the layer of the green body part; and monitoring an intensity of the light emitted by the fluorescent material, wherein the curing is performed until the intensity of the light emitted by the fluorescent material is below a predetermined threshold intensity.

According to a fifteenth aspect disclosed herein, a method of manufacturing a green body part comprises the method according to the fourteenth aspect, wherein the electromagnetic radiation is ultraviolet (UV) radiation.

According to a sixteenth aspect disclosed herein, a method of manufacturing a green body part comprises the method according to the fifteenth aspect, wherein the UV radiation has a wavelength from greater than or equal to 340 nm to less than or equal to 600 nm.

According to a seventeenth aspect disclosed herein, a method of manufacturing a green body part comprises the method according to the fifteenth aspect, wherein the UV radiation has a wavelength from greater than or equal to 340 nm to less than or equal to 400 nm.

According to an eighteenth aspect disclosed herein, a method of manufacturing a green body part comprises the method according to any of the previous aspects, wherein the powder comprises a metal powder.

According to a nineteenth aspect disclosed herein, a green body part comprises a powdered material adhered together with at least one binder comprising a fluorescent material.

According to a twentieth aspect disclosed herein, a binder solution comprises a thermoplastic binder comprising a first polymer strand having an average molecular weight from greater than or equal to 7,000 g/mol to less than or equal to 100,000 g/mol; a fluorescent material; and a binder medium.

Additional features and advantages of the embodiments disclosed herein will be set forth in the detailed description, which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Reference will now be made in detail to the present preferred embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, for example by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

The phrase "thermoplastic binder," as used herein, refers to a binder that includes one or more polymer strands having functional groups that may interact with one another via weak non-covalent forces (e.g., interactions, bonds) to link, or otherwise couple, strands of each respective thermoplastic polymer to one another.

As used herein, "non-covalently couple" means that the first and second functional groups interact with one another via weak non-covalent forces, such as interactions or bonds, to link or otherwise couple strands of the thermoplastic polymer. As used herein, the phrase "weak non-covalent forces" is intended to denote hydrogen bonding, ionic bonding, Van der Waals forces, and the like.

The parameter "viscosity" of the binder solution, as discussed herein, is measured using a rheometer in accordance with ASTM E3116.

As used herein, the phrases "green body metal part" and "green body part" denote a printed part that has not undergone heat treatment to remove the chemical binder. As used herein, the phrases "brown body metal part" and "brown body part" denote a printed part that has undergone heat treatment to remove at least a portion of the chemical binder. As used herein, a "metal part" means a part having metallic materials. While various embodiments are described in the context of metal parts, the binder solutions described herein are applicable to a wide variety of 3D printed parts, including but not limited to, polymer and ceramic parts.

The term "debinding," as used herein, refers to heating the green body part above a first temperature such that thermolysis of the thermoplastic binder into small oligomers occurs and at least a portion of the thermoplastic binder is removed, thereby forming a brown body part.

The term "sintering," as used herein, refers to heating the brown body part above a second temperature to remove a remaining portion of the thermoplastic binder (e.g., oligomeric residue and thermolytic byproducts formed during debinding) and consolidate the particles of the powder layer thereby forming a consolidated part.

The parameters "green body strength" and "brown body strength" of the parts, as discussed herein, are measured using a three-point flexural strength test in accordance with ASTM B312-14.

As used herein, the term "water" includes deionized water, distilled water, and tap water, unless otherwise specified. In embodiments, water is ASTM D1193 type IV water or better.

In many binder jetting additive manufacturing processes, a chemical binder (e.g., a polymeric adhesive) is used to bond layers of powder to one another to form a three-dimensional object. The chemical binder may be, for example, a polymeric adhesive that is selectively deposited onto a powder bed in a pattern representative of a layer of the part being manufactured. However, conventional chemical binders do not readily enable visual monitoring of the selective deposition of the chemical binder or allow for monitoring of the removal of the chemical binder, such as during curing. Moreover, conventional chemical binders do no not readily allow for identification or location of a completed green part within a powder bed.

Accordingly, various embodiments described herein provide binder solutions that include a linkable thermoplastic binder, a fluorescent material, and a binder medium. The fluorescent material is encapsulated in an encapsulating material, either prior to addition into the binder medium or upon addition into the binder medium, such that when it is deposited onto the powder bed, the fluorescent material emits light in response to exposure to electromagnetic radiation. Such embodiments can enable monitoring of various aspects of the additive manufacturing process, including for example, monitoring quantity and/or location of binder solution deposited onto the powder bed and extent of cure of a green body part formed using the binder solution. These and additional advantages will be described in greater detail below.

As set forth above, in various embodiments, the binder solution includes a thermoplastic binder, a fluorescent material, and a binder medium. In embodiments, the fluorescent material is encapsulated such that when deposited into a layer of powder and exposed to electromagnetic radiation, as will be described in greater detail below, the fluorescent material emits light that can be sensed and monitored to provide information regarding quantity and/or location of binder solution deposited onto the powder bed, extent of cure of a green body part formed using the binder solution, or the like.

In various embodiments, the binder solution includes one or more fluorescent materials. As used herein, a "fluorescent material" refers to a material that, during exposure to visible or invisible electromagnetic radiation, emits radiation of another (and usually, longer) wavelength. Fluorescent materials can include, by way of example and not limitation, fluorescent dyes and fluorescent pigments.

Fluorescent pigments can include transparent organic plastics or resin particles containing fluorescent dyes that are molecularly dissolved or in solid solution. Such pigments can be made, for example, by molecularly dissolving the fluorescent dye in either thermosetting or thermoplastic resins while the resin is in liquid form. The solvent or carrier resin is then allowed to harden by cooling or curing and then is crushed or otherwise broken down to the desired particle size for use as a pigment. In various embodiments, the pigment particles range from greater than or equal to 0.1 µm to less than or equal to 1 µm in size and can have a high affinity to agglomerate in vehicle systems. For example, the pigment particles may range in size from greater than or equal to 0.1 µm to less than or equal to 1.0 µm, from greater than or equal to 0.2 µm to less than or equal to 1.0 µm, from greater than or equal to 0.3 µm to less than or equal to 1.0 µm, from greater than or equal to 0.4 µm to less than or equal to 1.0 µm, from greater than or equal to 0.5 µm to less than or equal to 1.0 µm, from greater than or equal to 0.6 µm to less than or equal to 1.0 µm, from greater than or equal to 0.7 µm to less than or equal to 1.0 µm, from greater than or equal to 0.8 µm to less than or equal to 1.0 µm, from greater than or equal to 0.9 µm to less than or equal to 1.0 µm, from greater than or equal to 0.1 µm to less than or equal to 0.8 µm, from greater than or equal to 0.2 µm to less than or equal to 0.8 µm, from greater than or equal to 0.3 µm to less than or equal to 0.8 µm, from greater than or equal to 0.4 µm to less than or equal to 0.8 µm, from greater than or equal to 0.5 µm to less than or equal to 0.8 µm, from greater than or equal to 0.6 µm to less than or equal to 0.8, from greater than or equal to 0.1 µm to less than or equal to 0.5 µm, from greater than or equal to 0.2 µm to less than or equal to 0.5 µm, from greater than or equal to 0.3 µm to less than or equal to 0.5 µm, or from greater than or equal to 0.4 µm to less than or equal to 0.5 µm, including any and all ranges and sub-ranges therein.

Suitable resins to be used as solvents or carriers for forming pigments and which form the solid basis for the pigment include melamine-formaldehyde, aryl monosulfonamide-aldehydes, and urea or melamine formaldehyde resins and condensation products. Other suitable resins and polymers can include acrylonitrile, polyamides, cellulosics, polyvinyl alcohol, methyl cellulose, gum tartar, polyvinyl acetates, polyvinyl chlorides, polyesters, acetals, or combinations thereof. Other resins or polymers may be used, provided that the fluorescent dye of the pigment is soluble therein.

When included in the binder solution, the fluorescent pigment is present in the binder solution in an amount of from greater than or equal to 0.01 wt % to less than or equal to 5.0 wt %, based on a total weight of the binder solution. For example, the fluorescent pigment may be present in an amount of from greater than or equal to 0.01 wt % to less than or equal to 5.0 wt %, from greater than or equal to 0.05 wt % to less than or equal to 5.0 wt %, from greater than or equal to 0.1 wt % to less than or equal to 5.0 wt %, from greater than or equal to 0.5 wt % to less than or equal to 5.0 wt %, from greater than or equal to 1.0 wt % to less than or equal to 5.0 wt %, from greater than or equal to 1.5 wt % to less than or equal to 5.0 wt %, from greater than or equal to 2.0 wt % to less than or equal to 5.0 wt %, from greater than or equal to 3.0 wt % to less than or equal to 5 wt %, from greater than or equal to 0.01 wt % to less than or equal to 4.0 wt %, from greater than or equal to 0.05 wt % to less than or equal to 4.0 wt %, from greater than or equal to 0.1 wt % to less than or equal to 4.0 wt %, from greater than or equal to 0.5 wt % to less than or equal to 4.0 wt %, from greater than or equal to 1.0 wt % to less than or equal to 4.0 wt %, from greater than or equal to 1.5 wt % to less than or equal to 4.0 wt %, from greater than or equal to 2.0 wt % to less than or equal to 4.0 wt %, from greater than or equal to 0.01 wt % to less than or equal to 2.5 wt %, from greater than or equal to 0.05 wt % to less than or equal to 2.5 wt %, from greater than or equal to 0.1 wt % to less than or equal to 2.5 wt %, from greater than or equal to 0.5 wt % to less than or equal to 2.5 wt %, from greater than or equal to 1.0 wt % to less than or equal to 2.5 wt %, from greater than or equal to 1.5 wt % to less than or equal to 2.5 wt %, from greater than or equal to 0.01 wt % to less than or equal to 1.0 wt %, from greater than or equal to 0.05 wt % to less than or equal to 1.0 wt %, from greater than or equal to 0.1 wt % to less than or equal to 1.0 wt %, or from greater than or equal to 0.5 wt % to less than or equal to 1.0 wt %, including any and all ranges and sub-ranges therein.

Commercially available pigments that are suitable for use can include, by way of example and not limitation, SPL594N Invisible Blue and SPL18N Signal Green™ available from DayGlo and A-305E Yellow and A-303E Red available from UMC Corp.

In various embodiments, the fluorescent material can be a fluorescent dye. Fluorescent dyes include aromatic dyes such as, stilbene dyes, pyrene dyes, coumarin dyes, anthracene dyes, tetracene dyes, and combinations thereof. In embodiments, such as when the binder medium is water, the fluorescent dye includes a chromophore having at least one sulfonate or triazine group. In some such embodiments, the chromophore includes two, three, or four sulfonate groups. In embodiments, the chromophore is a stilbene-based chromophore. It is contemplated that different chromophores can be incorporated into the binder solution depending on the particular binder medium employed.

When included in the binder solution, the fluorescent dye is present in the binder solution in an amount of from greater than or equal to 0.01 wt % to less than or equal to 5.0 wt %, based on a total weight of the binder solution. For example, the fluorescent dye may be present in an amount of from greater than or equal to 0.01 wt % to less than or equal to 5.0 wt %, from greater than or equal to 0.05 wt % to less than or equal to 5.0 wt %, from greater than or equal to 0.1 wt % to less than or equal to 5.0 wt %, from greater than or equal to 0.5 wt % to less than or equal to 5.0 wt %, from greater than or equal to 1.0 wt % to less than or equal to 5.0 wt %, from greater than or equal to 1.5 wt % to less than or equal to 5.0 wt %, from greater than or equal to 2.0 wt % to less than or equal to 5.0 wt %, from greater than or equal to 3.0 wt % to less than or equal to 5 wt %, from greater than or equal to 0.01 wt % to less than or equal to 4.0 wt %, from greater than or equal to 0.05 wt % to less than or equal to 4.0 wt %, from greater than or equal to 0.1 wt % to less than or equal to 4.0 wt %, from greater than or equal to 0.5 wt % to less than or equal to 4.0 wt %, from greater than or equal to 1.0 wt % to less than or equal to 4.0 wt %, from greater than or equal to 1.5 wt % to less than or equal to 4.0 wt %, from greater than or equal to 2.0 wt % to less than or equal to 4.0 wt %, from greater than or equal to 0.01 wt % to less than or equal to 2.5 wt %, from greater than or equal to 0.05 wt % to less than or equal to 2.5 wt %, from greater than or equal to 0.1 wt % to less than or equal to 2.5 wt %, from greater than or equal to 0.5 wt % to less than or equal to 2.5 wt %, from greater than or equal to 1.0 wt % to less than or equal to 2.5 wt %, from greater than or equal to 1.5 wt % to less than or equal to 2.5 wt %, from greater than or equal to 0.01 wt % to less than or equal to 1.0 wt %, from greater than or equal to 0.05 wt % to less than or equal to 1.0 wt %, from greater than or equal to 0.1 wt % to less than or equal to 1.0 wt %, or from greater than or equal to 0.5 wt % to less than or equal to 1.0 wt %, including any and all ranges and sub-ranges therein.

In various embodiments, the fluorescent dye is encapsulated in an encapsulating material. In embodiments, the encapsulating material can be, for example, a polymer or polymer matrix, although other encapsulating materials are contemplated. Without being bound by theory, it is believed that deposition of a binder solution including an unencapsulated fluorescent dye to a powder bed including metal powder may result in fluorescent quenching related primarily to nonradiative deactivation pathways. However, encapsulation of the fluorescent dye can block such quenching by blocking the formation of non-fluorescent complexes formed from the fluorescent dye and the metal powder, enabling the fluorescent dye to fluoresce in response to exposure to electromagnetic radiation, even when in contact with the metal powder.

The fluorescent dye can be encapsulated prior to incorporation into the binder solution, or it can be encapsulated on mixing into the binder solution. For example, in some embodiments, the fluorescent dye is encapsulated in a polymer matrix before being incorporated into the binder solution. In such embodiments, the fluorescent dye can be any dye described hereinabove, such as aromatic dyes (e.g., stilbene dyes, pyrene dyes, coumarin dyes, anthracene dyes, tetracene dyes, etc.). The polymer matrix can be, by way of example and not limitation, a polyethylene glycol (PEG) polymer, polyethylene oxide (PEO), polyvinyl alcohol or the like. By way of example, a commercially available encapsulated fluorescent dye that is suitable for use is Invisible Blue UV Reactive Water Dye, available from GLO Effex, although the use of other commercially available encapsulated fluorescent dyes is contemplated.

In other embodiments, the fluorescent dye is encapsulated on mixing into the binder solution. In such embodiments, one or more polymers within the binder solution, such as the polymers in the thermoplastic binder, encapsulate the fluorescent dye to block the formation of non-fluorescent complexes formed from the fluorescent dye and the metal powder. In such embodiments, the fluorescent dye can be any dye described hereinabove, such as aromatic dyes (e.g., stilbene dyes, pyrene dyes, coumarin dyes, anthracene dyes, tetracene dyes, etc.). In particular embodiments, the fluorescent dye includes two, three, or four sodium sulfonate functional groups, although different functional groups may additionally or alternatively be included depending on the binder medium. In embodiments, the fluorescent dye has a chromophore that includes at least one sulfonate or triazine group. Without being bound by theory, it is believed that the inclusion of such side chain functionalities on the chromophore can protect the inner fluorescent chromophore from direct exposure to the metal powder and protect it from quenching. Commercially suitable fluorescent dyes that can be added to the binder solution in a neat (e.g., unencapsulated, liquid) form include, by way of example and not limitation, fluorescent brighteners FB 210, FB 220, and FB 351, although other dyes can be used depending on the particular embodiment, provided it is soluble in the binder solution.

As described above, the binder solution also includes at least one binder. The binder imparts strength to the green body part by binding the particulate material and layers thereof together after the curing step in which some or all of the solvent of the binder solution is evaporated. Suitable binders include, but are not limited to, thermoplastic binders, thermoset binders, and non-polymeric binders such as waxes and sugars (e.g., glucose, fructose, derivatives thereof, or a combination thereof).

In embodiments, the binder comprises a thermoplastic binder comprising one or more thermoplastic polymer strands. As used herein, the term "polymer strand" includes a polymer backbone and a functional group grafted thereon. In embodiments, the thermoplastic binder is selected from a class of thermoplastic polymers that generally decompose into small oligomers, carbon dioxide and water without requiring the presence of oxygen. Accordingly, in embodiments, the thermoplastic binder may be cleanly and readily removed during debinding and sintering, to generate a consolidated part that is substantially free of the thermoplastic binder and decomposition products (e.g., char and metal oxides).

In embodiments, the one or more thermoplastic polymer strands includes a first polymer strand. In embodiments, the first polymer strand includes at least a first functional group. Functional groups of the first thermoplastic polymer strand may include, by way of example and not limitation, hydrogen bond donors, hydrogen bond acceptors, negatively charged groups, positively charged groups, or combinations thereof. In embodiments, the first functional group is part of the backbone of the first thermoplastic polymer strand. In embodiments, the first functional group of the first polymer strand may compliment a functional group of a second polymer strand of the thermoplastic binder to facilitate non-covalent coupling of the first and second polymer strands. For example, in embodiments, the first functional group is selected from hydroxyl groups, carboxylate groups, amine, thiol, amide, or other suitable functional groups that enable weak, non-covalent coupling of the first and second polymer strands.

In various embodiments, the first polymer strand includes one or more polymers, such as, but not limited to, polyvinyl alcohol (PVA), polyamides, polyacryl amide (PAAm), polyvinyl methyl ether maleic anhydride (PVME-MA), polyvinylpyrrolidone (PVP), polyacrylic acid (PAA), polymethyl methacrylate (PMMA), polystyrene (PS), derivatives thereof, and/or combinations thereof. In embodiments, the first polymer strand has an average molecular weight (Mw or weight average) of from greater than or equal to 7,000 g/mol to less than or equal to 100,000 g/mol. For example, the first polymer strand may have an average molecular weight of from greater than or equal to 7,000 g/mol to less than or equal to 100,000 g/mol, from greater than or equal to 7,000 g/mol to less than or equal to 75,000 g/mol, from greater than or equal to 7,000 g/mol to less than or equal to 50,000 g/mol, from greater than or equal to 7,000 g/mol to less than or equal to 30,000 g/mol, from greater than or equal to 7,000 g/mol to less than or equal to 25,000 g/mol, from greater than or equal to 7,000 g/mol to less than or equal to 23,000 g/mol, from greater than or equal to 9,000 g/mol to less than or equal to 50,000 g/mol, from greater than or equal to 9,000 g/mol to less than or equal to 30,000 g/mol, from greater than or equal to 9,000 g/mol to less than or equal to 25,000 g/mol, from greater than or equal to 9,000 g/mol to less than or equal to 23,000 g/mol, from greater than or equal to 13,000 g/mol to less than or equal to 50,000 g/mol, from greater than or equal to 13,000 g/mol to less than or equal to 30,000 g/mol, from greater than or equal to 13,000 g/mol to less than or equal to 25,000 g/mol, from greater than or equal to 13,000 g/mol to less than or equal to 23,000 g/mol, from greater than or equal to 23,000 to less than or equal to 50,000 g/mol, from greater than or equal to 23,000 g/mol to less than or equal to 30,000 g/mol, from greater than or equal to 23,000 g/mol to less than or equal to 25,000 g/mol, from greater than or equal to 25,000 g/mol to less than or equal to 50,000 g/mol, from greater than or equal to 25,000 g/mol to less than or equal to 30,000 g/mol, or from greater than or equal to 30,000 g/mol to less than or equal to 50,000 g/mol, including any and all ranges and subranges in between.

The first polymer strand is present in the binder solution in an amount of from greater than or equal to 1 wt % to less than or equal to 15 wt %, from greater than or equal to 1 wt % to less than or equal to 7 wt %, from greater than or equal to 3 wt % to less than or equal to 10 wt %, or from greater than or equal to 3 wt % to less than or equal to 9 wt %, based on a total weight of the water-based binder solution, including any and all ranges and subranges in between.

In embodiments, the one or more thermoplastic polymer strands further includes a second polymer strand. In embodiments, the second polymer strand includes at least a second functional group different from the first functional group of the first polymer strand. Functional groups of the second thermoplastic polymer strand can include, by way of example and not limitation, hydrogen bond donors, hydrogen bond acceptors, negatively charged groups, positively charged groups, or combinations thereof. In embodiments, the second functional group of the second polymer strand complements the first functional group of the first polymer strand of the thermoplastic binder to facilitate non-covalent coupling of the first and second polymer strands. For example, in various embodiments, the second functional group may be selected from hydroxyl groups, carboxylate groups, amine, thiol, amide, or other suitable functional groups that enable weak, non-covalent coupling of the first and second polymer strands.

In various embodiments, the second polymer strand includes one or more other polymers such as, but not limited to, polyacrylic acid (PAA), poly methacrylic acid (PmAA), polyacrylamide (PAAm), derivatives thereof, and/or combinations thereof. In embodiments, the second polymer strand has an average molecular weight (Mw or weight average) of from greater than or equal to 100 g/mol to less than or equal to 10,000 g/mol, or from greater than or equal to 500 g/mol to less than or equal to 10,000 g/mol. For example, the second polymer strand may have an average molecular weight of from greater than or equal to 100 g/mol to less than or equal to 10,000 g/mol, from greater than or equal to 100 g/mol to less than or equal to 5,000 g/mol, from greater than or equal to 500 g/mol to less than or equal to 10,000 g/mol, from greater than or equal to 500 g/mol to less than or equal to 5,000 g/mol, or from greater than or equal to 5,000 g/mol to less than or equal to 10,000 g/mol, including any and all ranges and subranges in between.

In embodiments, the particular polymer selected as the second polymer strand can vary depending on the particular polymer selected as the first polymer strand. For example, the first polymer strand can be PVA and the second polymer strand can be PAA. Other polymer combinations can be used, provided their functional groups are able to form non-covalent bonds with one another. For example, in embodiments, one of the functional groups is a hydrogen donor, while the other functional group is a hydrogen acceptor.

The second polymer strand is present in the binder solution in an amount of greater than or equal to 1 wt % and less than or equal to 10 wt %, greater than or equal to 1 wt % and less than or equal to 9 wt %, greater than or equal to 1 wt % and less than or equal to 8 wt %, greater than or equal to 1 wt % and less than or equal to 7 wt %, greater than or equal to 1 wt % and less than or equal to 6 wt %, or even greater than or equal to 1 wt % and less than or equal to 5 wt %, or any and all sub-ranges formed from any of these endpoints, based on a total weight of the binder solution.

The first polymer strand and the second polymer strand are included in the binder solution in amounts to enable a suitable degree of coupling between the first polymer strand and the second polymer strand to yield a green body part having a green strength suitable for handling during post-printing processes. In addition, the first polymer strand and the second polymer strand are present in amounts such that the binder solution has a viscosity of from greater than or equal to about 2 centipoise (cP) to less than or equal to about 40 cP using a rheometer. In embodiments, the binder solution has a viscosity of from greater than or equal to 2 cP to less than or equal to 40 cP, from greater than or equal to 2 cP to less than or equal to 35 cP, from greater than or equal to 2 cP to less than or equal to 30 cP, from greater than or equal to 2 cP to less than or equal to 25 cP, from greater than or equal to 2 cP to less than or equal to 20 cP, from greater than or equal to 2 cP to less than or equal to 15 cP, from greater than or equal to 2 cP to less than or equal to 12 cP, from greater than or equal to 4 cP to less than or equal to 40 cP, from greater than or equal to 4 cP to less than or equal to 35 cP, from greater than or equal to 4 cP to less than or equal to 30 cP, from greater than or equal to 4 cP to less than or equal to 25 cP, from greater than or equal to 4 cP to less than or equal to 20 cP, from greater than or equal to 4 cP to less than or equal to 15 cP, from greater than or equal to 4 cP to less than or equal to 12 cP, from greater than or equal to 6 cP to less than or equal to 40 cP, from greater than or equal to 6 cP to less than or equal to 35 cP, from greater than or equal to 6 cP to less than or equal to 30 cP, from greater than or equal to 6 cP to less than or equal to 25 cP, from greater than or equal to 6 cP to less than or equal to 20 cP, from greater than or equal to 6 cP to less than or equal to 15 cP, from greater than or equal to 6 cP to less than or equal to 12 cP, from greater than or equal to 8 cP to less than or equal to 40 cP, from greater than or equal to 8 cP to less than or equal to 35 cP, from greater than or equal to 8 cP to less than or equal to 30 cP, from greater than or equal to 8 cP to less than or equal to 25 cP, from greater than or equal to 8 cP to less than or equal to 20 cP, from greater than or equal to 8 cP to less than or equal to 15 cP, from greater than or equal to 8 cP to less than or equal to 12 cP, including any and all ranges and subranges in between. In various embodiments, the weight % ratio of the first polymer strand to the second polymer strand is 1:1, 2:1, 3:1, 4:1, 5:1, 6:1, 8:1, 10:1, or any other suitable ratio. In particular embodiments, the first polymer strand is present in an amount of from greater than or equal to 4 wt % to less than or equal to 6 wt % and the second polymer strand is present in an amount of from greater than or equal to 1 wt % to less than or equal to 2 wt %, and the weight % ratio is from 6:1 to 2:1. Although various embodiments are described herein with reference to first and second polymer strands, it is contemplated that, in some embodiments, the thermoplastic binder can include three or more polymer strands.

In addition to the fluorescent material and the thermoplastic binder, the binder solution includes a binder medium. The binder medium can include, for example, water, one or more non-aqueous solvents, or combinations thereof. The binder medium is generally non-reactive (e.g., inert) such that it does not react with the powder material or the thermoplastic binder in the binder solution to a degree that would substantially detrimentally alter the resulting performance of the binder solution. Suitable non-aqueous solvents include, by way of example and not limitation, 2-methoxy ethanol, butanol, 2-butanol, tert-butanol, 1-methoxy-2-propanol, 2-butoxy ethanol, isoamyl alcohol, isobutyl alcohol, ethylene glycol butyl ether, ethylene glycol, diethylene glycol, tetrahydrofuran (THF), methyl ethyl ketone (MEK), or combinations thereof. In embodiments, the solvent is present in the binder solution in an amount greater than or equal to 1 wt % and less than or equal to 75 wt %, greater than or equal to 1 wt % and less than or equal to 50 wt %, greater than or equal to 1 wt % and less than or equal to 25 wt %, greater than or equal to 1 wt % and less than or equal to 10 wt %, greater than or equal to 10 wt % and less than or equal to 75 wt %, greater than or equal to 10 wt % and less than or equal to 50 wt %, greater than or equal to 10 wt % and less than or equal to 25 wt %, greater than or equal to 25 wt % and less than or equal to 75 wt %, greater than or equal to 25 wt % and less than or equal to 50 wt %, or even greater than or equal to 50 wt % and less than or equal to 75 wt %, or any and all sub-ranges formed from any of these endpoints, based on a total weight of the binder solution.

In various embodiments, the binder medium additionally or alternatively includes water, which, in various embodiments, comprises the balance of the solution. In various embodiments, water is present in an amount of greater than 80 wt %, greater than 85 wt %, or even greater than 90 wt %, based on a total weight of the binder solution.

Although various embodiments are described with reference to a binder solution that includes a relatively large amount of water (e.g., water is the solvent that is present in the greatest amount by volume; referred to herein as an "aqueous binder solution" or a "water-based binder solution"), it is contemplated that binder solutions may be based on non-aqueous solvent(s) (also referred to herein as a "solvent-based" solution), and thus can include a minor amount of or, in some embodiments, no, water. Thus, it is contemplated that the fluorescent material disclosed herein can be used in conjunction with a wide variety of binder solutions.

In embodiments, the binder solution may optionally include one or more additives, such as additives that may facilitate deposition of the thermoplastic binder into the powder material, facilitate dispersion of the fluorescent material within the binder medium, improve the wettability of the powder material, modify the surface tension of the binder solution, or the like. Optional additives include surfactants, diluents, viscosity modifiers, dispersants, stabilizers, dyes or other colorants, or other additives known and used in the art. In some embodiments, the binder solution includes at least one surfactant.

Surfactants suitable for use in the binder solution include ionic (e.g., zwitterionic, cationic, or anionic) or non-ionic depending on the properties of the thermoplastic binder and/or powder material. In various embodiments, the surfactant can be 2-[4-(2,4,4-trimethylpentan-2-yl)phenoxy] ethanol (e.g., TRITON™ X-100 available from The Dow Chemical Company), polyoxyethylene (80) sorbitan monooleate (e.g., TWEEN™ 80 available from Croda Americas, Inc.), polyoxyethylene-23-lauryl ether (e.g., BRIJ™ L23 available from Croda Americas, Inc.), alkylene oxide copolymer (e.g., HYPERMER™ KD2 available from Croda Advanced Materials), sodium dodecyl sulfate (SDS), hexadecyltrimethylammonium bromide (CTAB), dodecyltrimethylammonium bromide (DTAB), polypropoxy quaternary ammonium chloride (e.g., VARIQUAT™ CC 42 NS available from Evonik Industries), and combinations thereof.

Figure 1:
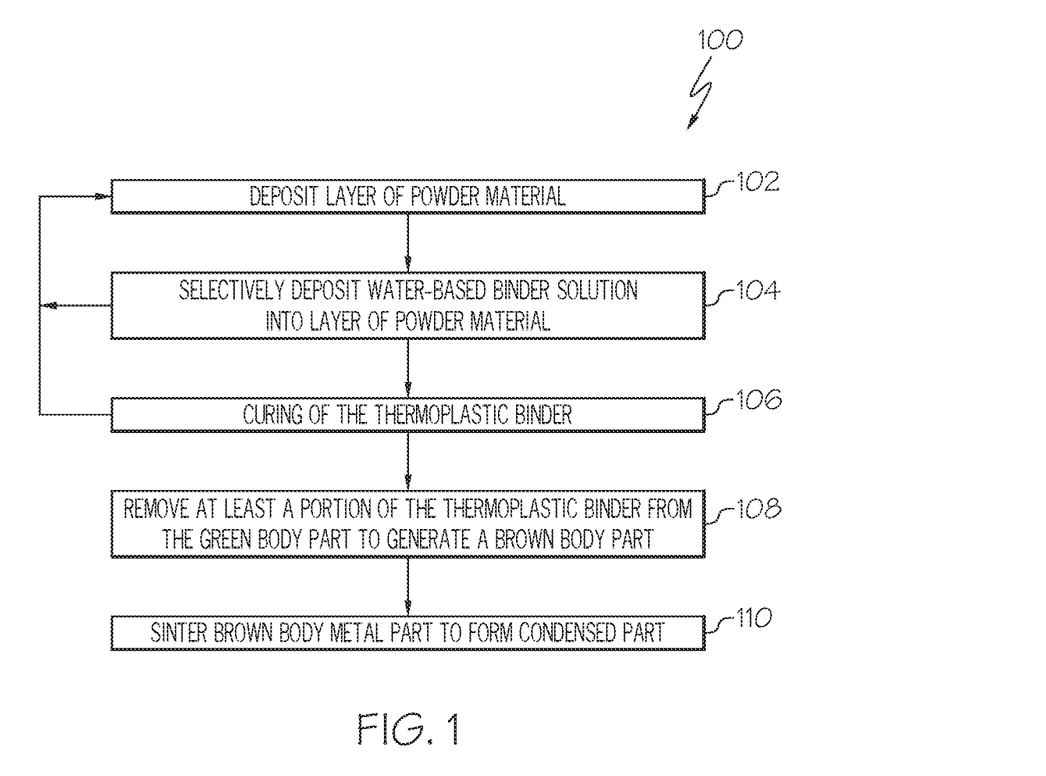
FIG. 1 is a flow diagram of an example method of manufacturing a part via additive manufacturing using a water-based binder solution including a thermoplastic binder according to one or more embodiments shown and described herein.

FIG. 1 is a block diagram depicting an embodiment of a method 100 for manufacturing an article via additive manufacturing using the water-based binder solutions described herein. To facilitate discussion of aspects of the method 100, reference is made to FIG. 2, which is a block diagram depicting an embodiment of an additive manufacturing apparatus 200 that can be used to perform method 100.

Figure 2:
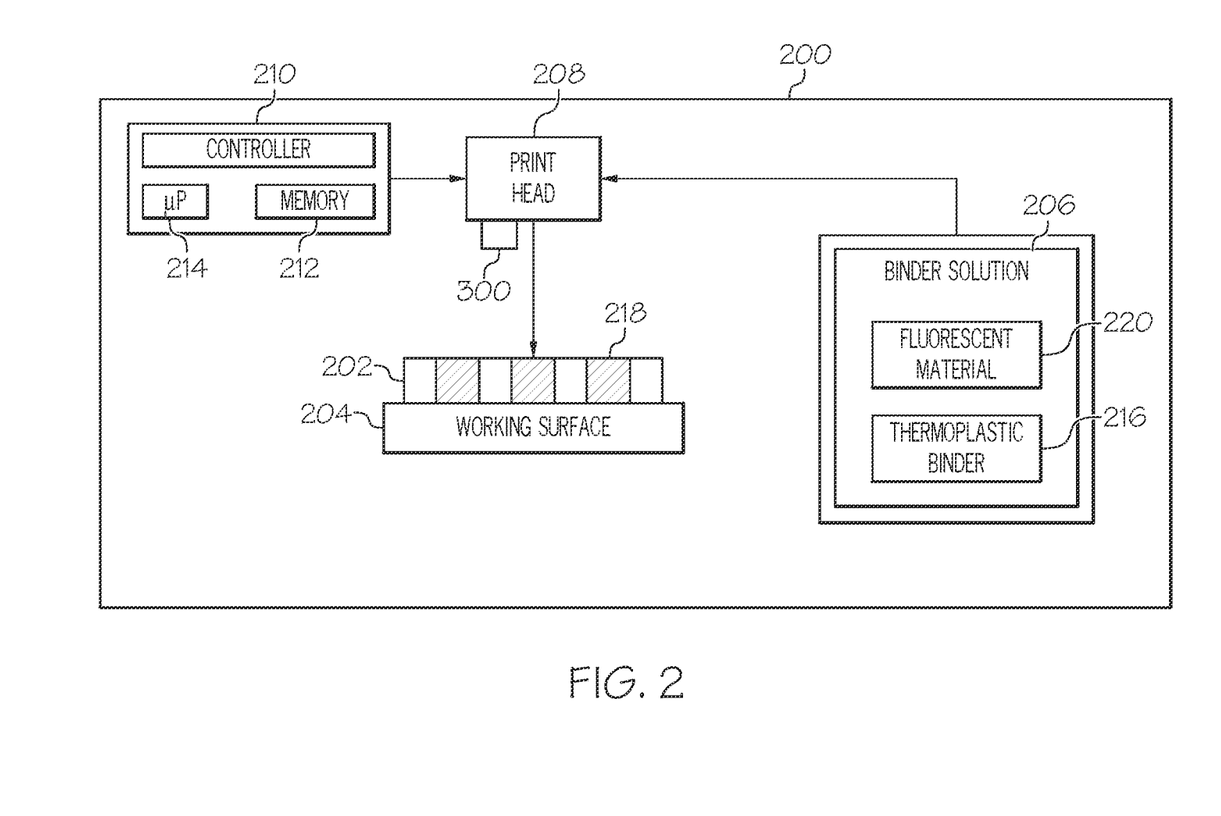
FIG. 2 is a block diagram of an embodiment of an additive manufacturing apparatus used to manufacture the part in accordance with the method of FIG. 1.

As depicted in FIG. 1, the method 100 begins with depositing a layer of a powder material 202 that is used to manufacture a part (block 102). In various embodiments, the layer of the powder material 202 is deposited on a working surface 204 of the additive manufacturing apparatus. The powder material can be a metal powder, such as a nickel alloy (e.g., Inconel 625, Inconel 718, Rene'108, Rene'80, Rene'142, Rene'195, Rene'M2, and/or Marm-247), a cobalt alloy (e.g., X40, X45, FSX414, Hans 188 and/or L605), a cobalt-chromium alloy, a titanium alloy, an aluminum-based alloy, tungsten, stainless steel, or a combination thereof. Other powder materials may be used depending on the particular embodiment. For example, in embodiments, the powder material 202 may include a ceramic material, such as alumina, aluminum nitride, zirconia, titania, silica, silicon nitride, silicon carbide, boron nitride, or a combination thereof. In embodiments, the powder material 202 may include a high temperature polymer or a glass material.

Next, the method 100 continues with selectively depositing a binder solution 206 into the layer of powder material 202 in a pattern representative of a structure of a layer of the part (block 104). The binder solution 206 can be, for example, any one of various embodiments of the binder solution described herein, that includes a binder and a fluorescent material 220 in a solvent. In various embodiments, the binder solution 206 is selectively printed using a print head 208 that is operated by a controller 210 based on a CAD design that includes a representation of the layer of the part being printed.

In various embodiments, the controller 210 for controlling the print head 208 may include a distributed control system or any suitable device employing a general purpose computer or application-specific device. The controller 210 generally includes memory 212 storing one or more instructions for controlling operation of the print head 208. In embodiments, the memory 212 stores CAD designs representative of a structure of the part being manufactured. In embodiments, the CAD designs can include distortion compensation and, as such, the CAD design may not exactly match the geometry of the final desired part. Additionally, the controller 210 includes at least one processor 214 (e.g., microprocessor), and the memory 212 may include one or more tangible, non-transitory, machine-readable media collectively storing instructions executable by the processor 214 to control actions described herein.

After the binder solution 206 is selectively deposited into the layer of powder material 202, the thermoplastic binder 216 in the binder solution 206 at least partially coats an outer surface of powder particles, thereby generating binder-coated particles 218. As will be described, the thermoplastic binder 216 bonds the binder-coated particles 218 according to the pattern of the binder solution 206 printed into the layer of powder material 202 to form a layer of the green body part.

The method 100 may repeat the steps of depositing a layer of powder material (block 102) and selectively depositing the binder solution 206 into the layer of powder material (block 104) to continue building up the part in a layer-by-layer manner until a desired number of layers have been printed. The thermoplastic binder 216 of the binder solution 206 bonds each successive layer and provides a certain degree of strength (e.g., green strength) to the printed part such that the integrity of the structure of the printed green body part is maintained during post-printing processes (e.g., transferring, inspecting, and/or depowdering). That is, the green strength provided by the thermoplastic binder 216 of the binder solution 206 maintains bonding between the particles of the powder material 202 within the layers and blocks (e.g., resists and/or prevents) delamination of the layers during handling and post-printing processing of the green body part.

In various embodiments, the green printed parts fluoresce when exposed to electromagnetic radiation as a result of the fluorescent material 220 in the binder solution 206. The intensity of the fluorescence will depend on the fluorescent material 220 included, the specific powder material 202, and, in various embodiments, the quantity of binder solution 206 present in the green printed part. In various embodiments, the fluorescence of the printed green part, and specifically, the intensity of the light emitted enables monitoring of the method of making the printed green part and the curing of the printed green part to form a brown body part or consolidated part, as will be described in greater detail.

In various embodiments, the method 100 continues with curing of the thermoplastic binder (block 106). For example, as discussed hereinabove, the binder solution 206 is a mixture of a fluorescent material 220, a thermoplastic binder 216, and a solvent. While a portion of the solvent in the binder solution 206 may be evaporated during deposition (e.g., printing) of the binder solution 206, a certain amount of the solvent may remain within the layer of the powder material 202. Therefore, in embodiments, the binder solution 206 may be thermally cured at a temperature that is suitable for evaporating the solvent and, in some embodiments, a portion of the fluorescent material 220 remaining in the printed layer and allowing efficient bonding of the printed layers, thereby forming the green body part. Heat may be applied to the printed part using an IR lamp and/or heated plate, or may be carried out by placing the printed part in an oven. In embodiments, curing the binder solution 206 comprises heating the printed layers at a temperature greater than or equal to 25° C. and less than or equal to 100° C., greater than or equal to 30° C. and less than or equal to 90° C., greater than or equal to 35° C. and less than or equal to 80° C., or even greater than or equal to 40° C. and less than or equal to 70° C., or any and all sub-ranges formed from any of these endpoints.

Unbound particles from the powder layer (e.g., the powder material that is not bonded by the binder solution 206) may be removed after the curing step of block 106 to prepare the green body part for post-processing steps such as debinding and sintering.

In embodiments, the evaporation of the solvent from the green body part results in a decreased intensity in the light emitted by the green body part upon exposure to the electromagnetic radiation. Without being bound by theory, it is believed that in some embodiments, the evaporation of the solvent leads to the fluorescent material becoming unencapsulated and, as a result, may be deactivated by the metal powder, thereby reducing the intensity of the fluorescent signal. It is further believed that, in some embodiments, the powder absorbs the photons more effectively, thereby reducing the excitation of the fluorescent material by the UV light. Further, in embodiments, depending on the chemical structure of the fluorescent material and the temperature at which the green body part is cured, at least part of the fluorescent material can evaporate or decompose. Thus, the intensity of the light emitted by the green body part correlates to the extent of cure, where a lower intensity corresponds to greater cure of the green body part. Accordingly, in embodiments, the green body part may be cured until the intensity of the light emitted by the green body part is below a predetermined threshold intensity.

After curing, the green body part may undergo an optional drying step (not shown in FIG. 1) to remove any residual solvent and/or other volatile materials that remain in the green body part. For example, the green body part may be dried in a vacuum, under an inert atmosphere (e.g., nitrogen or argon) or air, or at slightly elevated temperatures (e.g., up to 170° C. or even up to 200° C., depending on the particular solvents present in the binder solution).

In the embodiment depicted in FIG. 1, the method 100 includes removing (e.g., debinding) a portion of the thermoplastic binder 216 from the green body part to generate a brown body part (block 108). In various embodiments, the binder provides strength (e.g., green strength) to the printed part and, as such, only a portion (i.e., less than all) of the thermoplastic binder 216 is removed during debinding of the green body part to improve the handling strength of the resulting brown body part before sintering.

During the debinding at block 108, the green body part is heated to break down a portion of the polymer strand(s) of the thermoplastic binder 216. For example, the green body part may be heated to a temperature that is about 600° C. or less, or about 450° C. or less. In embodiments, the green body part is heated to a temperature of from 250° C. to 450° C. The heating can be performed, for example, in an oxygen-free environment (e.g., in a vacuum, an inert atmosphere, or combination of both), or in air. In embodiments in which the debinding is performed in an inert atmosphere, argon, nitrogen, or another substantially inert gas may be used. In some embodiments, the debind step may be combined with the sintering step to in order to make the final consolidated part.

According to various embodiments, the debinding step of block 108 is effective to remove greater than about 95% of the thermoplastic binder 216. For example, greater than or equal to 95%, greater than or equal to 96%, greater than or equal to 97%, greater than or equal to 98%, or greater than or equal to 99% of the total amount of thermoplastic binder 216 is removed during debinding. In some embodiments, the portion of the thermoplastic binder 216 that remains in the brown body part is less than or equal to 5%, less than or equal to 4%, less than or equal to 3%, less than or equal to 2%, or less than or equal to 1% of the amount of thermoplastic binder 216 that was present prior to the debinding step. In embodiments, the portion of the thermoplastic binder 216 that remains in the brown body part is from 0.05% to 2% or from 0.1% to 1% of the amount of thermoplastic binder 216 that was present prior to the debinding step and is removed in the later stage of sintering process (e.g., beyond 600° C. and into the higher sintering temperatures as described in accordance with block 110 for stainless steel, nickel alloys, and the like).

Following debinding at block 108, the method 100 continues with sintering the brown body part to form the consolidated part (block 110). During sintering, the remaining portion of the thermoplastic binder (e.g., oligomers formed during debinding) is removed from the brown body part and the particles of powder are consolidated to form the consolidated part. Sintering imparts strength and integrity to the brown body part such that, after cooling, the consolidated part is suitable for use in machinery, for example.

In some embodiments, sintering may be performed according to a two-step process including a pre-sintering step in which the remaining portion of the thermoplastic binder is removed and a sintering step in which the powder particles are consolidated. In some embodiments, sintering may be performed as a single step. During sintering, the brown body part is heated to temperatures of greater than 500° C., greater than 800° C., or greater than 1000° C. In embodiments, heat may be applied by placing the brown body part in an oven, or by exposing the brown body part to a concentrated source of energy, such as a laser beam, an electron beam, or another suitable energy source, depending on the particular embodiment.

Although various embodiments described herein are described with reference to method 100, it should be understood that embodiments of the binder solution described herein can be used with a variety of methods that are known and used by those skilled in the art. In particular, curing and sintering may be accomplished in a number of different ways, in a number of different steps, and in a number of different locations.

As described hereinabove, various embodiments of binder solutions including a fluorescent material enable the additive manufacturing process to be visually monitored. In embodiments, the fluorescent material may be visible to the human eye. Additionally, or alternatively, an optical imaging system may be used to observe the fluorescent material and, in embodiments, quantify the amount of binder solution present in the powder layer based on the observed fluorescence.

Accordingly, in embodiments, the binder solution is quantified or detected by observing the ultraviolet (UV) fluorescence of the binder solution. In such embodiments, the powder material 202 of the powder layer may be illuminated with UV light at a wavelength of less than or equal to about 400 nm, and fluoresces at a wavelength of greater than or equal to 400 nm at portions where the binder solution is present. For example, a UV light sensor 300, such as that depicted in FIG. 3, may be employed. Although various embodiments are described with respect to UV fluorescence, fluorescence at other wavelengths, including but not limited to near infrared (IR) wavelengths, is contemplated.

Figure 3:
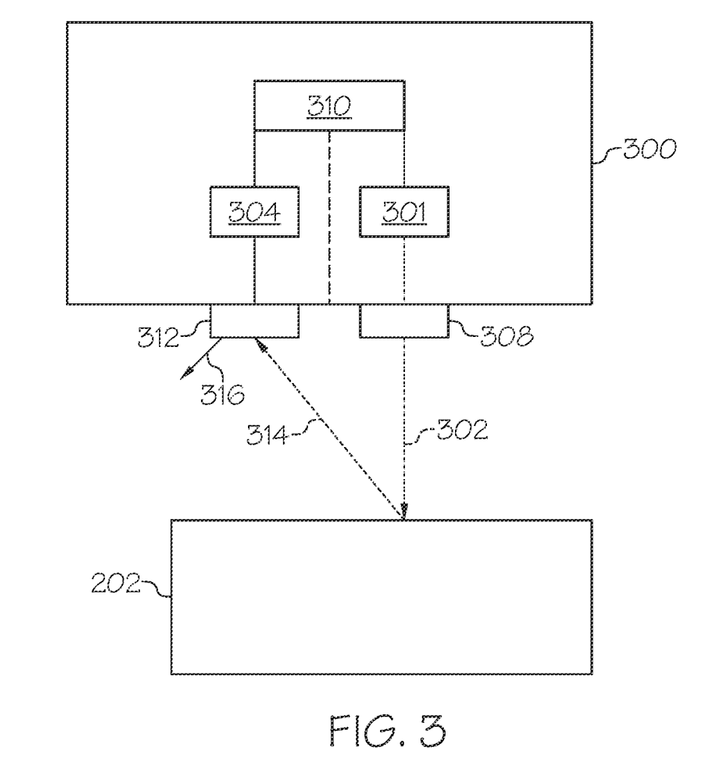
FIG. 3 schematically depicts an ultraviolet (UV) light sensor for monitoring the additive manufacturing process according to FIG. 1.

Referring now to FIG. 3, the UV light sensor 300 is depicted in greater detail. In various embodiments, the UV light sensor 300 is a luminescence sensor which emits UV light and detects the resulting visible glow caused by the interaction of the UV light with a phosphorescent material, such as the encapsulated fluorescent material. In particular, the UV light sensor 300 detects the resulting visible glow caused by the interaction of the UV light in areas of the powder layer where the binder solution 206, including the fluorescent material 220, is present. In embodiments, the UV light sensor 300 may emit UV light at one or more wavelengths of less than or equal to 600 nm, less than or equal to 400 nm, less than or equal to 375 nm, or less than or equal to 370 nm. For example, the UV light sensor 300 may emit light at a wavelength of from greater than or equal to 150 nm to less than or equal to 600 nm, from greater than or equal to 175 nm to less than or equal to 500 nm, from greater than or equal to 340 nm to less than or equal to 600 nm, from greater than or equal to 340 nm to less than or equal to 400 nm, or from greater than or equal to 200 nm to less than or equal to 400 nm, including any and all ranges and subranges therein. In one particular embodiment, the UV light sensor 300 emits light at a wavelength of 365 nm, although other wavelengths are contemplated and may be used depending on the particular fluorescent material employed.

Moreover, it is contemplated that, in embodiments, a different electromagnetic radiation source, such as a light source emitting light at wavelengths other than UV wavelengths, may be employed. Accordingly, although various embodiments described herein are described with reference to a "UV light sensor" and a "UV light source," it is contemplated that other light sensors and electromagnetic radiation sources can be employed depending on the particular fluorescent material 220 included in the binder solution 206. Specifically, suitable electromagnetic radiation sources include those that excite the fluorescent material 220 and cause the fluorescent material 220 to emit light in response to exposure electromagnetic radiation emitted by the electromagnetic radiation source.

In various embodiments, the UV light sensor 300 includes a UV light source 301, which emits UV light 302, a photodetector 304 (such as a photo diode or the like) that detects visible light 306 emitted by the target (e.g., the powder material 202 in the powder layer) when the UV light 302 is incident on the target, and a lens 308 that directs the UV light 302 toward the target (e.g., the powder material 202). The UV light source 301 may be, for example, a mercury lamp with a UV filter or a UV LED. The UV light sensor 300 may further include an electronic circuit 310 that provides power to the UV light source 301 and photodetector 304 and produces an output indicative of detected light. In embodiments, the UV light sensor 300 further includes a dichroic mirror 312 that separates the reflected light 314 into UV light 316, which is directed away from the photodetector 304, and visible light 306, which is directed toward the photodetector 304.

As an alternative to using the UV light sensor 300 of FIG. 3, in some embodiments, a UV light source may be used to illuminate the powder material 202 and the fluorescence may be detected with the human eye or through the use of another type of camera or optical detector. Moreover, it is contemplated that the UV light sensor 300 and/or the photodetector or other optical detector may be positioned at a different location than on the print head 208. For example, the UV light sensor 300 may be located on a wall of the build box or otherwise mounted within or on the additive manufacturing apparatus. In still other embodiments, the UV light sensor 300 may be mounted in or on an oven or other accelerated curing apparatus, such as in embodiments in which the UV light sensor 300 is used to monitor an extent of curing of the printed part, as will be described in greater detail.

In various embodiments, the information collected from the photodetector 304 is processed (e.g., by the UV light sensor 300, by the controller 210, or by another computing device communicatively coupled to the UV light sensor 300) to determine the presence or quantity of the binder solution 206 in the powder material 202 based on the intensity of the light emitted by the fluorescent material 220. For example, in embodiments, the information collected from the photodetector 304 may be used to generate an image of each layer of the printed part, which can be compared to an expected image of the layer to identify spatial defects including jet misfires, inaccurate binder quantity deposition (e.g., saturation) and extent of binder cure. In particular, where the expected image of the layer does not match the generated image, an issue can be identified by the system, and an alert can be generated. Alternatively, or additionally, the system may cause the print head 208 to be cleaned, the binder solution 206 to be refilled in a binder solution reservoir, or other maintenance on the additive manufacturing apparatus to be performed. In embodiments, the system may cause all or part of the layer to be re-printed.

In embodiments, the computing device processing the information from the photodetector 304 includes information regarding the fluorescence of the binder solution 206 at various concentrations, which may be, for example, stored in a database. The information regarding the fluorescence includes, for example, the intensity of the light emitted by the fluorescent material 220 and the location of the light emitted by the fluorescent material 220. Such information can be used to determine a concentration of the binder solution (e.g., how much solvent is present in the binder solution) based on an observed level of fluorescence. In particular, as the solvent evaporates or is otherwise removed during curing, the fluorescence of the binder solution 206 decreases. Accordingly, in embodiments, the amount of fluorescence observed by the photodetector 304 is used to determine an extent of cure (e.g., how much the printed part has cured and how much binder solution remains). In embodiments, curing can be performed until the intensity of the light emitted by the fluorescent material 220 is below a predetermined threshold intensity. The predetermined threshold intensity can be determined based on an amount of binder solution 206 present in a green body part that has sufficient strength to enable the green body part to be moved or subjected to other post-printing processes. In embodiments, the predetermined threshold intensity is an intensity value greater than zero and less than the maximum intensity observed and can be, for example, less than or equal to 75% of the maximum intensity, less than or equal to 50% of the maximum intensity, less than or equal to 35% of the maximum intensity, less than or equal to 25% of the maximum intensity, less than or equal to 15% of the maximum intensity, less than or equal to 10% of the maximum intensity, less than or equal to 5% of the maximum intensity, less than or equal to 2.5% of the maximum intensity, or less than or equal to 1% of the maximum intensity.

Additionally, or alternatively, the amount of fluorescence observed by the photodetector 304 is used to determine that the binder solution 206 has become concentrated (such as through the evaporation of the solvent from the binder solution).

EXAMPLES

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples.

Example 1

To a binder solution including 1-7 wt % PVA, 0.5-3 wt % PAA, 2-6 wt % ethylene glycol, 4-10 wt % ethylene glycol butyl ether, and the balance water, a pigment solution (pigment in water) was added. The pigment solutions for used in each of Samples A-D are provided in Table 1 below.

TABLE 1

|  | Sample A | Sample B | Sample C | Sample D |
| --- | --- | --- | --- | --- |
| Pigment | SPL594N (DayGlo) | A-305E Yellow (UMC Corp.) | SPL18N (DayGlo) | A-303E Red (UMC Corp.) |
| wt % pigment in pigment solution | 46-50 | 46 | 46-50 | 46 |
| Emission color | Blue | Yellow | Green | Red |

When added at a concentration to yield a 1,000× dilution of the pigment in the binder solution (0.1 wt % pigment in the binder solution), the fluorescent pigment particles could be observed floating in the binder solution, giving the binder solutions a slightly hazy appearance. However, when diluted at 10,000× (0.01 wt % pigment in the binder solution), the pigment particles were solubilized in the binder solution, and the binder solution was clear.

A droplet of each of binder Samples A-D was placed on a layer of nickel alloy powder, and the results were observed under both ambient light and under short UV wavelength light (365 nm). Fluorescence was observed at the location of the droplets for each of Samples A-D at both 1,000× dilution and 10,000× dilution concentrations. Accordingly, it was determined that fluorescent pigments could be used to monitor additive manufacturing processes when incorporated into binder solutions.

Example 2

To prepare Sample E, 0.25 wt % Glo Effex Invisible blue UV reactive dye was added to a binder solution including 1-7 wt % PVA, 0.5-3 wt % PAA, 2-6 wt % ethylene glycol, 4-10 wt % ethylene glycol butyl ether, and the balance water. A droplet of the binder solution was placed on a layer of nickel alloy powder, and the results were observed under both ambient light and under short UV wavelength light (365 nm). Upon exposure to the UV wavelength light, bright blue fluorescence was observed, indicating that the encapsulated fluorescent material could be used to monitor additive manufacturing processes when incorporated into binder solutions.

Example 3

To determine whether neat dyes (e.g., unencapsulated) could be incorporated into binder solutions, various fluorescent materials were added to a binder solution including 1-7 wt % PVA, 0.5-3 wt % PAA, 2-6 wt % ethylene glycol, 4-10 wt % ethylene glycol butyl ether, and the balance water to form Samples F-H, and Comparative Samples 1-5. In particular, from 0.2-0.5 wt % of the fluorescent material (DayGlo, UMCCorp, Aldrich) was added to the binder solution and stirred on a hot plate at 50-70° C. to dissolve the dye into the binder solution. Droplets of each of the binder solutions of Samples F-H and Comparative Samples 1-5 were added to a layer of Rene 108 nickel alloy powder and excited using 365 nm UV light. The fluorescent material and solubility and fluorescence observations for each of these samples are presented in Table 2.

TABLE 2

| | Dye | Solubility at 0.5 wt % | Fluorescence |
|---|---|---|---|
| Sample F | FB 210 | Soluble | Faint, homogenous signal |
| Sample G | FB 220 | Soluble | Moderate, homogenous signal |
| Sample H | FB 351 | Soluble | Bright, homogenous signal |
| Comp. Sample 1 | FB 134 | Insoluble | Faint, non-homogenous signal |
| Comp. Sample 2 | FB 28 | Partially soluble – turbid | Quenched |
| Comp. Sample 3 | FB 71 | Partially soluble – turbid | Quenched |
| Comp. Sample 4 | FB 85 | Partially soluble – turbid | Quenched |
| Comp. Sample 5 | FB 113 | Partially soluble – turbid | Quenched |

In particular, at 0.5 wt % fluorescent dye in the binder solution, the dyes in Samples F, G, and H were fully soluble, yielding clear binder solutions, while the dyes in Comparative Samples 2-5 were partially insoluble, leading to turbid solutions. When added to a layer of Rene 108 nickel alloy powder and excited using 365 nm UV light, each of the dyes of Samples F-H produced homogenous signals of varying emission levels. Comparative Sample 1 produced a sputtered emission signal due to the insolubility of the dye in the binder solution.

To more fully understand the observations, the structures of the dyes were investigated. The structure for each of the dyes are presented in Table 3 below.

TABLE 3

| Sample | Dye | Structure |
|---|---|---|
| Sample F | FB 210 | (chemical structure shown: a complex molecule with triazine rings, phenyl groups, stilbene linkage, $NaO_3S$, $SO_3Na$, $N(HOH_2CH_2C)_2$, and NH substituents) |

TABLE 3-continued

| Sample | Dye | Structure |
|---|---|---|
| Sample G | FB 220 |  |
| Sample H | FB 351 |  |
| Comp. Sample 1 | FB 134 |  |
| Comp. Sample 2 | FB 28 |  |

TABLE 3-continued

| Sample | Dye | Structure |
|---|---|---|
| Comp. Sample 3 | FB 71 |  |
| Comp. Sample 4 | FB 85 |  |
| Comp. Sample 5 | FB 113 |  |

By looking at the structures of the various dyes, it was concluded that the stilbene chromophore-based disodium salts included in Comparative Samples 1-5 did not exhibit good solubility in the binder solution, although the stilbene chromophore-based tetra-sodium salts in Samples F and G had good solubility. These stilbene chromophore-based tetra-sodium salts, however, exhibited relatively weak fluorescence on the metal powder bed when compared to the biphenyl styryl chromophore disodium salt of Sample H, which exhibited both good solubility in the binder solution and bright, homogenous fluorescence on the metal powder bed.

Without being bound by theory, it is believed that certain functionalities or property characteristics are important for the neat dye to be encapsulated by the polymers of the binder solution. In particular, it is believed that di-, tri-, and tetra-sodium sulfonate functional groups enables the dye to be soluble in a water-based binder system, such as the binder solution employed in the examples. Moreover, it is believed that side chain functionalities such as sulfonate, triazine, and the like, enable the inner fluorescent chromophore to be protected from direct exposure to metal powders, thereby protecting it from quenching. However, it should be understood that the particular functional groups can vary depending on the particular binder system and can vary, for example, when the dye is to be incorporated in a solvent-based binder solution or when applied to a different type of powder, such as a ceramic or polymer-based powder.

Further aspects of the invention are provided by the subject matter of the following clauses:

1. A method of manufacturing a green body part, comprising: depositing a layer of a powder on a working surface; and selectively depositing a binder solution comprising a thermoplastic binder, a fluorescent material, and a binder medium into the layer of powder in a pattern representative of a structure of a layer of the green body part wherein: the thermoplastic binder comprises one or more polymer strands dissolved in a solvent medium having an average molecular weight from greater than or equal to 7,000 g/mol to less than or equal to 100,000 g/mol.

2. The method according to any preceding clause, wherein the fluorescent material is encapsulated prior to incorporation into the binder solution.

3. The method according to any preceding clause, wherein the fluorescent material is encapsulated on mixing into the binder solution.

4. The method according to any preceding clause, the one or more polymer strands comprise one or more polymer species selected from the group consisting of polyvinyl alcohol (PVA), polyamides, polyacryl amide (PAAm), polyvinyl pyrrolidone (PVP), polyacrylic acid (PAA), polymethacrylic acid (PmAA), polymethyl methacrylate (PMMA), polyvinyl methyl ether-maleic anhydride (PVME-MA), polystyrene (PS), polyethylene oxide, polyethylene glycol (PEG), derivatives thereof, and combinations thereof.

5. The method according to any preceding clause, wherein the one or more polymer strands of the thermoplastic binder comprise a first polymer strand and a second polymer strand, wherein the first polymer strand comprises a first functional group and the second polymer strand comprises a second functional group different from the first functional group, wherein the first and second functional groups are configured to non-covalently couple the first polymer strand with the second polymer strand, and wherein the second polymer strand has an average molecular weight greater than or equal to 100 g/mol and less than or equal to 10,000 g/mol.

6. The method according to any preceding clause, wherein the fluorescent material comprises an aromatic dye that is encapsulated.

7. The method according to any preceding clause, wherein the aromatic dye is selected from the group consisting of a stilbene dye, pyrene dye, a coumarin dye, an anthracene dye, a tetracene dye, and combinations thereof.

8. The method according to any preceding clause, wherein the fluorescent material comprises a chromophore having at least one sulfonate or triazine group.

9. The method according to any preceding clause, wherein the chromophore comprises two, three, or four sulfonate groups.

10. The method according to any preceding clause, wherein the chromophore is a stilbene-based chromophore.

11. The method according to any preceding clause, wherein the binder solution is an aqueous binder solution.

12. The method according to any preceding clause, wherein the encapsulated fluorescent material is present in an amount of from 0.01 wt % to 5 wt % based on a total weight of the binder solution.

13. The method according to any preceding clause, wherein the encapsulated fluorescent material is present in an amount of from 0.1 wt % to 1 wt % based on a total weight of the binder solution.

14. The method according to any preceding clause, the method further comprising: exposing the layer of the green body part to electromagnetic radiation; curing the layer of the green body part; and monitoring an intensity of the light emitted by the fluorescent material, wherein the curing is performed until the intensity of the light emitted by the fluorescent material is below a predetermined threshold intensity.

15. The method according to any preceding clause, wherein the electromagnetic radiation is ultraviolet (UV) radiation.

16. The method according to any preceding clause, wherein the UV radiation has a wavelength from greater than or equal to 340 nm to less than or equal to 600 nm.

17. The method according to any preceding clause, wherein the UV radiation has a wavelength from greater than or equal to 340 nm to less than or equal to 400 nm.

18. The method according to any preceding clause, wherein the powder comprises a metal powder.

19. A green body part formed according to the method of any preceding clause.

20. A green body part comprising a powdered material adhered together with at least one binder comprising a fluorescent material.

21. A binder solution comprising: a thermoplastic binder comprising a first polymer strand having an average molecular weight from greater than or equal to 7,000 g/mol to less than or equal to 100,000 g/mol; a fluorescent material; and a binder medium.

22. The binder solution according to any preceding clause, wherein the fluorescent material is encapsulated prior to incorporation into the binder solution.

23. The binder solution according to any preceding clause, wherein the fluorescent material is encapsulated on mixing in to the binder solution.

24. The binder solution according to any preceding clause, the first polymer strand comprises one or more polymer species selected from the group consisting of polyvinyl alcohol (PVA), polyamides, polyacryl amide (PAAm), polyvinyl pyrrolidone (PVP), polyacrylic acid (PAA), polymethacrylic acid (PmAA), polymethyl methacrylate (PMMA), polyvinyl methyl ether-maleic anhydride (PVME-MA), polystyrene (PS), polyethylene oxide, polyethylene glycol (PEG), derivatives thereof, and combinations thereof.

25. The binder solution according to any preceding clause, wherein the thermoplastic binder further comprises a second polymer strand, wherein the first polymer strand comprises a first functional group and the second polymer strand comprises a second functional group different from the first functional group, wherein the first and second functional groups are configured to non-covalently couple the first polymer strand with the second polymer strand, and wherein the second polymer strand has an average molecular weight greater than or equal to 100 g/mol and less than or equal to 10,000 g/mol.

26. The binder solution according to any preceding clause, wherein the fluorescent material comprises an aromatic dye that is encapsulated.

27. The binder solution according to any preceding clause, wherein the aromatic dye is selected from the group consisting of a stilbene dye, pyrene dye, a coumarin dye, an anthracene dye, a tetracene dye, and combinations thereof.

28. The binder solution according to any preceding clause, wherein the fluorescent material comprises a chromophore having at least one sulfonate or triazine group.

29. The binder solution according to any preceding clause, wherein the chromophore comprises two, three, or four sulfonate groups.

30. The binder solution according to any preceding clause, wherein the chromophore is a stilbene-based chromophore.

31. The binder solution according to any preceding clause, wherein the binder solution is an aqueous binder solution.

32. The binder solution according to any preceding clause, wherein the encapsulated fluorescent material is present in an amount of from 0.01 wt % to 5 wt % based on a total weight of the binder solution.

33. The binder solution according to any preceding clause, wherein the encapsulated fluorescent material is present in an amount of from 0.1 wt % to 1 wt % based on a total weight of the binder solution.

34. A green body part adhered together using the binder solution according to any preceding clause.

It will be apparent to those skilled in the art that various modifications and variations can be made to embodiment of the present disclosure without departing from the spirit and scope of the disclosure. Thus, it is intended that the present disclosure cover such modifications and variations provided they come within the scope of the appended claims and their equivalents.

What is claimed is:

1. A method of manufacturing a green body part, comprising:
   depositing a layer of powder on a working surface; and
   selectively depositing a binder solution comprising a thermoplastic binder, an encapsulated fluorescent material, and a binder medium into the layer of powder in a pattern representative of a structure of a layer of the green body part wherein:
      the thermoplastic binder comprises one or more polymer strands dissolved in a solvent medium having a weight average molecular weight from greater than or equal to 7,000 g/mol to less than or equal to 100,000 g/mol; and
      the encapsulated fluorescent material comprises at least one of an aromatic dye and a chromophore having at least one sulfonate or triazine group.

2. The method according to claim 1, wherein the encapsulated fluorescent material comprises a fluorescent material that is encapsulated prior to incorporation into the binder solution.

3. The method according to claim 1, wherein the encapsulated fluorescent material comprises a fluorescent material that is encapsulated on mixing into the binder solution.

4. The method according to claim 1, wherein the one or more polymer strands comprise one or more polymer species selected from the group consisting of polyvinyl alcohol (PVA), polyamides, polyacryl amide (PAAm), polyvinyl pyrrolidone (PVP), polyacrylic acid (PAA), polymethacrylic acid (PmAA), polymethyl methacrylate (PMMA), polyvinyl methyl ether-maleic anhydride (PVME-MA), polystyrene (PS), polyethylene oxide, polyethylene glycol (PEG), derivatives thereof, and combinations thereof.

5. The method according to claim 1, wherein the one or more polymer strands of the thermoplastic binder comprise a first polymer strand and a second polymer strand, wherein the first polymer strand comprises a first functional group and the second polymer strand comprises a second functional group different from the first functional group, wherein the first and second functional groups are configured to non-covalently couple the first polymer strand with the second polymer strand, and wherein the second polymer strand has a weight average molecular weight greater than or equal to 100 g/mol and less than or equal to 10,000 g/mol.

6. The method according to claim 1, wherein the encapsulated fluorescent material comprises an aromatic dye that is encapsulated.

7. The method according to claim 6, wherein the aromatic dye is selected from the group consisting of a stilbene dye, pyrene dye, a coumarin dye, an anthracene dye, a tetracene dye, and combinations thereof.

8. The method according to claim 1, wherein the encapsulated fluorescent material comprises a chromophore having at least one sulfonate or triazine group.

9. The method according to claim 8, wherein the chromophore comprises two, three, or four sulfonate groups.

10. The method according to claim 8, wherein the chromophore is a stilbene-based chromophore.

11. The method according to claim 1, wherein the binder solution is an aqueous binder solution.

12. The method according to claim 1, wherein the encapsulated fluorescent material is present in an amount of from 0.01 wt % to 5 wt % based on a total weight of the binder solution.

13. The method according to claim 12, wherein the encapsulated fluorescent material is present in an amount of from 0.1 wt % to 1 wt % based on a total weight of the binder solution.

14. The method according to claim 1, the method further comprising:
   exposing the layer of the green body part to electromagnetic radiation;
   curing the layer of the green body part; and
   monitoring an intensity of light emitted by the encapsulated fluorescent material, wherein the curing is performed until the intensity of the light emitted by the encapsulated fluorescent material is below a predetermined threshold intensity.

15. The method according to claim 14, wherein the electromagnetic radiation is ultraviolet (UV) radiation.

16. The method according to claim 15, wherein the UV radiation has a wavelength from greater than or equal to 340 nm to less than or equal to 600 nm.

17. The method according to claim 15, wherein the UV radiation has a wavelength from greater than or equal to 340 nm to less than or equal to 400 nm.

18. The method according to claim 1, wherein the powder comprises a metal powder.

19. A green body part comprising a powdered material adhered together with at least one binder comprising an encapsulated fluorescent material comprising at least one of an aromatic dye and a chromophore having at least one sulfonate or triazine group.

20. A binder solution comprising:
   a thermoplastic binder comprising a first polymer strand having a weight average molecular weight from greater than or equal to 7,000 g/mol to less than or equal to 100,000 g/mol;
   an encapsulated fluorescent material comprising at least one of an aromatic dye and a chromophore having at least one sulfonate or triazine group; and
   a binder medium.

* * * * *